United States Patent
Yasuda et al.

(10) Patent No.: US 10,819,266 B2
(45) Date of Patent: Oct. 27, 2020

(54) MOTOR DRIVING SYSTEM AND MOTOR DRIVING METHOD

(71) Applicant: RENESAS ELECTRONICS CORPORATION, Tokyo (JP)

(72) Inventors: Yusuke Yasuda, Tokyo (JP); Narihira Takemura, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 204 days.

(21) Appl. No.: 16/046,349

(22) Filed: Jul. 26, 2018

(65) Prior Publication Data

US 2019/0074788 A1 Mar. 7, 2019

(30) Foreign Application Priority Data

Sep. 7, 2017 (JP) .................. 2017-171753

(51) Int. Cl.
*H02P 23/14* (2006.01)
*B60L 15/00* (2006.01)
(Continued)

(52) U.S. Cl.
CPC .............. *H02P 23/14* (2013.01); *B60L 1/003* (2013.01); *B60L 3/0092* (2013.01); *B60L 15/00* (2013.01);
(Continued)

(58) Field of Classification Search
CPC ...... B60L 15/00; B60L 1/003; B60L 2240/14; B60L 2240/421; B60L 2240/429; B60L 2240/642; B60L 2250/26; B60L 2260/46; B60L 3/0092; B60W 50/0097; H02P 23/14; H02P 23/20
See application file for complete search history.

(56) References Cited

U.S. PATENT DOCUMENTS 9,203,332 B2 12/2015 Yamada
10,214,232 B2 * 2/2019 Sakaguchi ........... B62D 5/0463
(Continued)

FOREIGN PATENT DOCUMENTS

| EP | 2 097 291 A1 | 9/2009 |
| EP | 2 728 736 A1 | 5/2014 |
| JP | 5702237 B2 | 4/2015 |

OTHER PUBLICATIONS

Extended European Search Report issued in corresponding European Patent Application No. 18187777.0-1205, dated Feb. 22, 2019.

*Primary Examiner* — Tyler J Lee

(74) *Attorney, Agent, or Firm* — McDermott Will & Emery LLP

(57) ABSTRACT

Provided are a motor angle detector for detecting a motor angle, a current detector for detecting a motor current value to drive a motor, a vehicle inclination angle detector for detecting a vehicle inclination angle, a motor control circuit for outputting a control signal to control the driving of the motor, and a storage apparatus. The storage apparatus stores data obtained by associating the motor current value, a setting value in the motor control circuit for outputting the control signal, the vehicle inclination angle, and the motor angle at a first time with each other, and the motor control circuit controls the driving of the motor on the basis of information of the motor current value and the vehicle inclination angle at a second time and the data at the first time.

8 Claims, 8 Drawing Sheets

(51) Int. Cl.
  *H02P 23/20*   (2016.01)
  *B60W 50/00*   (2006.01)
  *B60L 3/00*    (2019.01)
  *B60L 1/00*    (2006.01)

(52) U.S. Cl.
  CPC ......... *B60W 50/0097* (2013.01); *H02P 23/20* (2016.02); *B60L 2240/14* (2013.01); *B60L 2240/421* (2013.01); *B60L 2240/429* (2013.01); *B60L 2240/642* (2013.01); *B60L 2250/26* (2013.01); *B60L 2260/46* (2013.01)

(56) References Cited

U.S. PATENT DOCUMENTS

| | | | | |
|---|---|---|---|---|
| 2014/0046541 | A1* | 2/2014 | Tsai | ................... B62M 6/45 701/41 |
| 2015/0303858 | A1* | 10/2015 | Katsumata | .......... B60L 15/2081 318/139 |
| 2017/0229984 | A1 | 8/2017 | Sato et al. | |

* cited by examiner

| TIME | MOTOR ANGLE | VEHICLE SPEED | VEHICLE INCLINATION ANGLE | MOTOR CURRENT VALUE | PWM SETTING VALUE |
|---|---|---|---|---|---|
| T1 | a | d | g | j | m |
| T2 | b | e | h | k | n |
| T3 | c | f | i | l | o |
| ... | ... | ... | ... | ... | ... |

MOTOR DRIVING SYSTEM AND MOTOR DRIVING METHOD

CROSS-REFERENCE TO RELATED APPLICATIONS

The disclosure of Japanese Patent Application No. 2017-171753 filed on Sep. 7, 2017 including the specification, drawings and abstract is incorporated herein by reference in its entirety.

BACKGROUND

The present invention relates to a driving control technique for a motor, and particularly to an effective technique by applying to a motor driving system that controls a motor for driving wheels in an electric vehicle.

In an electric vehicle such as HEV/EV (Hybrid Electric Vehicle/Electric Vehicle), a motor unit is provided with an angle detector for detecting the angle of a motor shaft to perform efficient motor driving, and proper driving control is performed in accordance with the magnetic pole position of the motor shaft on the basis of angle information obtained from the angle detector.

Thus, for example, in the case where the angle detector is damaged or cables are disconnected, the angle of the motor shaft cannot be correctly detected, and thus the motor cannot be normally driven. Or a desired torque cannot be generated. If an electric vehicle stops on a road because the motor driving cannot be normally performed, it causes a traffic hindrance. Thus, even in the case where a failure occurs in the angle detector of the motor shaft or the wiring system thereof, it is possible to safely, promptly, and easily respond to the failure, for example, if the electric vehicle can travel by itself to a safe place on the side of the road, a repair shop or the like.

As a related technique, for example, Japanese Patent No. 5702237 describes that wheel speed-enabled motor angle prediction means for predicting the angle of a motor shaft on the basis of a detection signal of a wheel rotation speed detector is provided, and a motor shaft angle output from the wheel speed-enabled motor angle prediction means is used instead of an angle detection value by a motor angle detector in the case where a failure occurs in the motor angle detector. Accordingly, even if a failure occurs in the motor angle detector, it is possible to control in accordance with the magnetic pole position of the motor shaft.

SUMMARY

The wheel speed-enabled motor angle prediction means in the related art described in Japanese Patent No. 5702237 only records a correspondence relation between a motor angle detection value and a wheel speed in a normal state into a storage apparatus. In the case where the motor angle detector is determined as a failure, the angle of the motor shaft in accordance with the present wheel speed is merely predicted on the basis of the correspondence relation.

Thus, for example, it is possible to predict the angle of the motor shaft with a proper accuracy in a stable condition with less influence of a travelling environment such a flat area with little roughness or a straight road with little curve. On the other hand, for example, in an inclined or gradient condition of a road such as a mountain road or a slope, or in a road surface condition such as water, freeze, snow, or gravel on a road surface where wheels idle, there may be a case in which the detected wheel speed does not match the actual vehicle speed or the torque condition. In this case, the angle of the motor shaft cannot be properly predicted. Thus, for example, there may be a dangerous state in which acceleration or deceleration that is not intended by the driver occurs, or the vehicle goes down a slope in the worst case because a sufficient torque cannot be obtained on an upward slope.

The other objects and novel features will become apparent from the description of the specification and the accompanying drawings.

The following is a summary of the representative outline of the invention disclosed in the application.

A motor driving system according to an embodiment includes: a motor angle detection circuit that receives a motor angle signal to detect a motor angle that is the angle of a rotor of a motor; a current detection circuit that receives a motor current signal to detect a motor current value that is the value of a current for driving the motor; a mobile object inclination angle detection circuit that receives an inclination angle signal to detect a mobile object inclination angle that is the inclination angle of a mobile object that moves by driving the motor; a motor control circuit that outputs a control signal for controlling the driving of the motor; and a storage apparatus. The storage apparatus stores data obtained by associating the motor current value, a setting value in the motor control circuit for outputting the control signal, the mobile object inclination angle, and the motor angle at a first time with each other, and the motor control circuit controls the driving of the motor on the basis of information of the motor current value and the mobile object inclination angle at a second time and the data at the first time.

According to the above-described embodiment, even in the case where a motor angle detector fails and the detected wheel speed does not match the actual vehicle speed or the torque condition when predicting the angle of a motor shaft on the basis of the wheel speed, it is possible to drive the motor by properly predicting the angle of the motor shaft.

DETAILED DESCRIPTION

Hereinafter, embodiments of the present invention will be described in detail on the basis of the drawings. It should be noted that the same parts are followed by the same signs in principle in all the drawings for explaining the embodiments, and the repeated explanation thereof will be omitted. On the other hand, a part explained by adding a sign in a drawing will not be illustrated again when explaining the other drawings, but will be referred to in some cases by adding the same sign.

Figure 11:
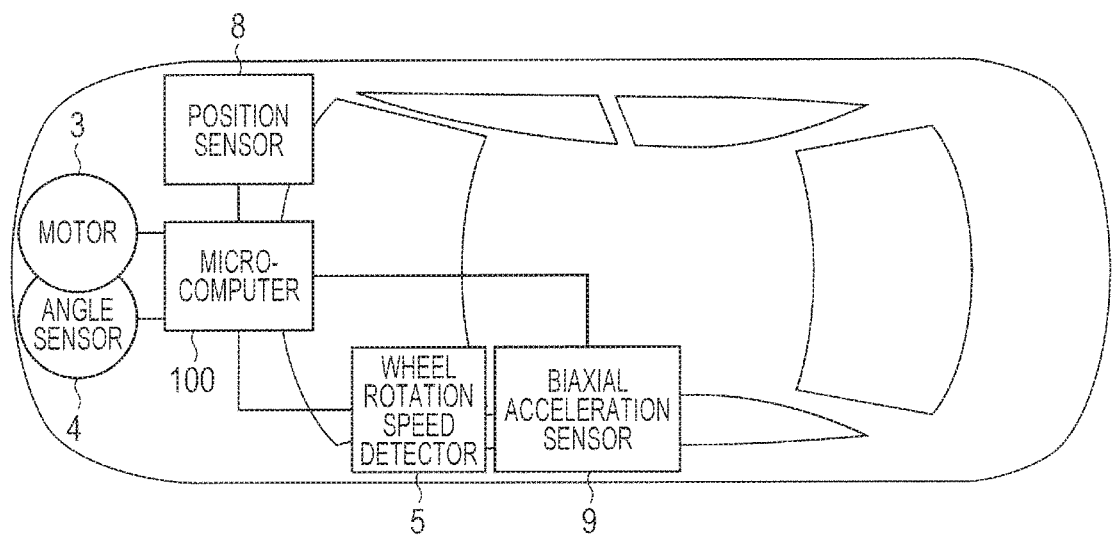
FIG. 11 is a diagram for showing an outline of an example of a vehicle and a sensor and the like mounted in the vehicle.

FIG. 11 is a diagram for showing an outline of an example of a vehicle and a sensor and the like mounted in the vehicle. As illustrated in the drawing, a vehicle such as HEV and EV includes, for example, a motor 3 for driving the vehicle and an angle sensor 4 for detecting the angle of a motor shaft, and controls the driving of the motor 3 in accordance with the magnetic pole position of the motor shaft using a microcomputer 100 for controlling the motor on the basis of angle information obtained from the angle sensor 4. The vehicle further includes various sensors such as a position sensor 8 for detecting information of the opening degree of the accelerator by the driver and the pressing degree of the brake, a wheel rotation speed detector 5 for detecting the rotation speed of the wheels, and a biaxial acceleration sensor 9 (or a gyro sensor) for detecting information of the inclination angle of the vehicle, and uses the detected information for driving control of the motor 3 by transmitting the same to the microcomputer 100.

First Embodiment

Figure 1:
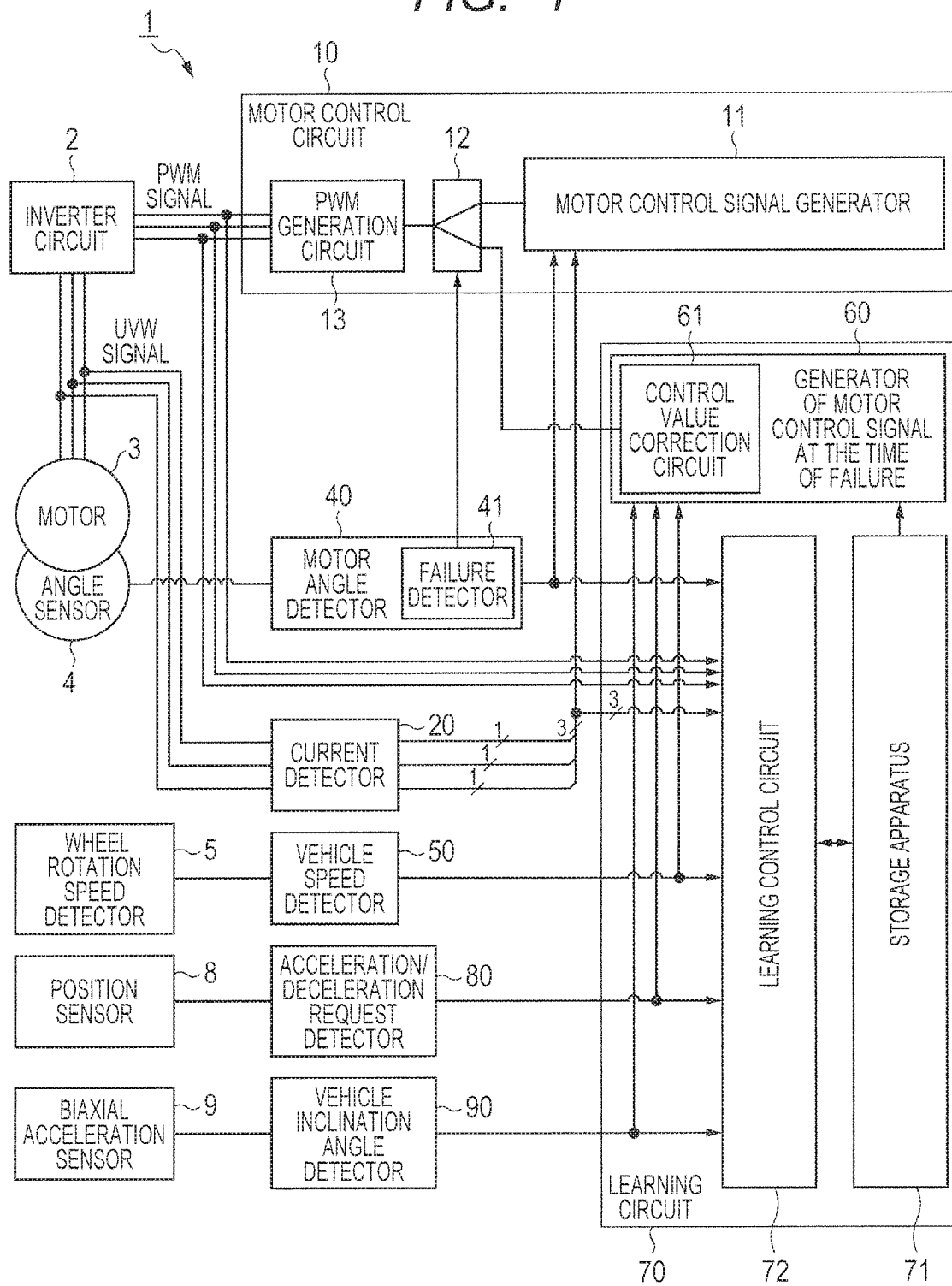
FIG. 1 is a diagram for showing an outline of a configuration example of a motor driving system that is a first embodiment of the present invention.

FIG. 1 is a diagram for showing an outline of a configuration example of a motor driving system that is a first embodiment of the present invention. A motor driving system 1 of the embodiment has, for example, circuits and devices such as a motor control circuit 10, a motor angle detector 40, a current detector 20, a vehicle speed detector 50, a learning circuit 70, an acceleration/deceleration request detector 80, and a vehicle inclination angle detector 90.

Figure 12:
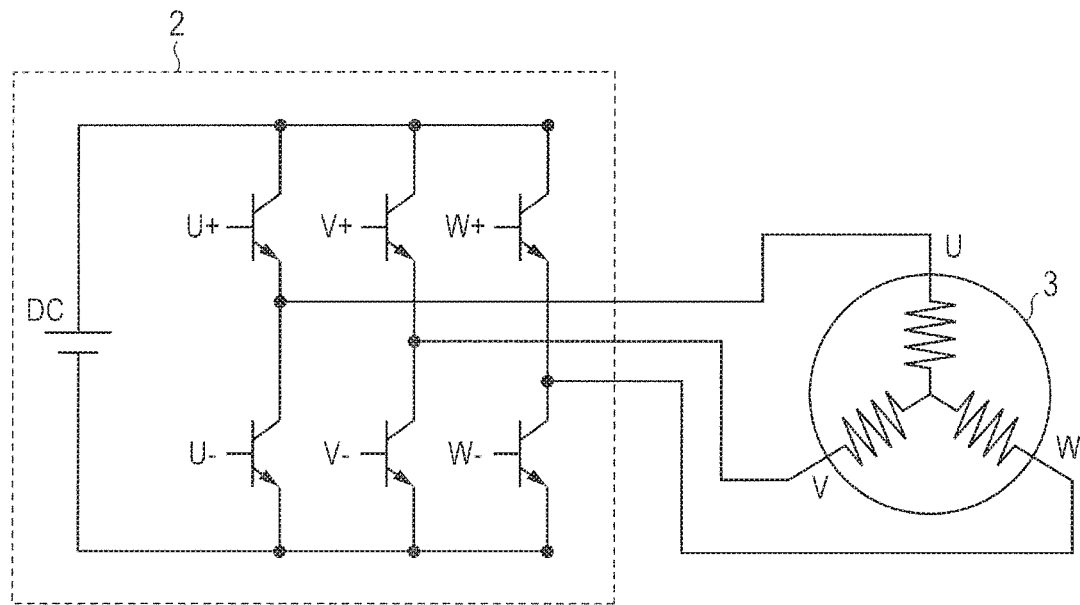
FIG. 12 is a diagram for showing an outline of an example of a circuit diagram of the inverter circuit and the motor.

A motor 3 to be driven is configured using, for example, a three-phase synchronous motor that is a driving motor for HEV/EV. Further, an inverter circuit 2 is configured using, for example, a plurality of semiconductor switching elements, and outputs three-phase (U, V, and W phases) driving currents of the motor 3 in the form of a pulse waveform on the basis of a command from the motor control circuit 10, so that direct electric power of a battery (not shown) is converted into three-phase alternate electric power used for driving the motor 3. An outline of an example of a circuit diagram of the inverter circuit 2 and the motor 3 is shown in FIG. 12. It should be noted that an object to be moved or travelled by driving of the motor 3 is a vehicle such as HEV/EV in the embodiment. However, the embodiment is not limited to this, but can be applied to various mobile objects.

With reference to FIG. 1 again, an angle sensor 4 for detecting and outputting information of the angle of the motor shaft is installed in the motor 3. For example, a sensor using a hall element, a resolver sensor, or the like can be used for the angle sensor 4. In addition, the motor angle detector 40 has a function of calculating the magnetic pole position (hereinafter, referred to as "motor angle" in some cases) of the motor shaft (motor rotor) of the motor 3 on the basis of information of a motor angle signal from the angle sensor 4. The information of the calculated motor angle is output to the motor control circuit 10 through a selector 12, and is also recorded and accumulated in a storage apparatus 71 configured using a RAM (Random Access Memory) or the like through a learning control circuit 72 in a learning circuit 70. It should be noted that in addition to the information of the motor angle from the motor angle detector 40, information from the learning circuit 70 to be described later is input to the selector 12. However, the information of the motor angle from the motor angle detector 40 is selected to be output in a normal state.

The pulse waveform (UVW signal) of an output of a driving current in each layer from the inverter circuit 2 is input to the current detector 20, and the current detector 20 obtains a current value of each layer. The obtained current value is output to the motor control circuit 10 as information related to the torque of the motor 3, and is also recorded and accumulated in the storage apparatus 71 in the learning circuit 70. Further, a value from a wheel rotation speed detector 5 that is installed in a vehicle such as HEV/EV and is a sensor for detecting the rotation speed of the wheels is input to the vehicle speed detector 50, and the vehicle speed detector 50 obtains a wheel rotation speed per unit time on the basis of which the speed of the vehicle is calculated. The information of the calculated vehicle speed is output to the motor control circuit 10, and is also recorded and accumulated in the storage apparatus 71 in the learning circuit 70.

The motor control circuit 10 has, for example, a motor control signal generator 11, the selector 12, and a PWM generation circuit 13. The motor control signal generator 11 obtains the information of the motor angle output from the motor angle detector 40, and generates a control signal for the PWM generation circuit 13 on the basis of the information so as to properly drive the motor 3. Then, the motor control signal generator 11 outputs the control signal through the selector 12. The PWM generation circuit 13 generates and outputs a signal (PWM (Pulse Width Modulation) signal) for controlling on/off of a switching element in each phase of the inverter circuit 2 on the basis of the input control signal. Accordingly, the motor control circuit 10 can perform proper driving control in accordance with the motor angle of the motor 3.

On the other hand, the motor angle detector 40 includes a failure detector 41 for detecting a failure of the angle sensor 4 or the motor angle detector 40 itself. The failure detector 41 performs, for example, self-diagnosis at regular time intervals or all the time to detect abnormalities such as a disconnection abnormality (disconnection of signal lines between the angle sensor 4 and the motor angle detector 40), a power supply abnormality (short-circuit of the power supply of the sensor signal), a ground abnormality (short-circuit of the ground of the sensor signal), and an angle conversion abnormality (operation abnormality of angle conversion in the motor angle detector 40). Then, in the case where any one of the abnormalities is detected, namely, in the case where the motor angle cannot be correctly obtained (hereinafter, simply referred to as "at the time of failure" in some cases), a failure detection signal is output to the motor control circuit 10.

The motor control circuit 10 with the failure detection signal input is switched by the selector 12 so that the control signal input to the PWM generation circuit 13 is obtained not from the motor control signal generator 11 but from a generator 60 of a motor control signal at the time of failure in the learning circuit 70.

The generator 60 of a motor control signal at the time of failure in the learning circuit 70 predicts the motor angle of the motor 3 on the basis of information of the present vehicle speed of the vehicle detected by the vehicle speed detector 50, and generates a control signal for the PWM generation circuit 13 on the basis of the motor angle. Then, the generator 60 outputs the control signal through the selector 12.

In the related art, as a method of predicting the motor angle, for example, on the basis of information (learning data) of a correspondence relation among the value (the value actually detected by the motor angle detector 40) of the motor angle in a normal state recorded in the storage apparatus 71, the vehicle speed (the value actually detected by the vehicle speed detector 50), and the torque (the value actually detected by the current detector 20), the value of the motor angle corresponding to the present vehicle speed is obtained as a predicted value.

On the contrary, in addition to the learning data of the correspondence relation among the vehicle speed, the torque, and the motor angle recorded in the storage apparatus 71, information of the vehicle inclination angle that is the inclination angle of the vehicle is further recorded in the embodiment. The information of the vehicle inclination angle is calculated by the vehicle inclination angle detector 90 on the basis of, for example, information of an inclination angle signal output from a biaxial acceleration sensor 9 (or a gyro sensor) installed in the vehicle. The travelling environments (an upward slope, a downward slope, a flat road, and the like) can be recognized on the basis of the information. In addition, these pieces of information are obtained and recorded in the storage apparatus 71 not only in a normal state, but also during the travelling of the vehicle under the driving control of the motor 3 at the time of failure in the embodiment. Accordingly, information related to the travelling environment in a situation where the driving control of the motor 3 is performed on the basis of the learning data at the time of failure can be reflected on the learning data.

The learning circuit 70 has the learning control circuit 72 in addition to, for example, the generator 60 of a motor control signal at the time of failure and the storage apparatus 71. The generator 60 of a motor control signal at the time of failure generates the control signal to be output to the PWM generation circuit 13 at the time of failure as described above. The generator 60 is included in the learning circuit 70 in the embodiment, but may be included in the motor control circuit 10.

In the learning circuit 70, the learning control circuit 72 associates the UVW current value of the motor 3 output from the current detector 20 in a normal state, the PWM signal output from the PWM generation circuit 13, the information of the vehicle speed output from the vehicle speed detector 50, and the information of the vehicle inclination angle output from the vehicle inclination angle detector 90 with the information of the motor angle output from the motor angle detector 40, and records, as needed, the same in the storage apparatus 71 as the learning data. As a recording method, for example, a table of a matrix showing a correspondence relation among these pieces of information is configured and recorded. Namely, the vehicle speed in a normal state, the torque information, the motor angle, and the vehicle inclination angle (namely, information related to the travelling environment such as a mountain road or a slope) are recorded (or recorded as a correction coefficient) while being associated with each other as a matrix. Accordingly, the motor angle can be properly predicted in accordance with the travelling environment.

As described above, the motor 3 can be driven while properly adapting to a difference such as the inclination condition and the road surface condition of a road even at the time of failure of the vehicle by storing various parameters related to vehicle driving in a normal state. Further, even in the case where the vehicle speed and the torque cannot be obtained in the motor 3, or the vehicle speed and the torque are excessive, the driving control of the motor 3 can be properly performed on the basis of a request of acceleration/deceleration by the driver.

Further, information of the degree (namely, also referred to as a correction instruction from the driver for the driving control of the motor 3 by the motor driving system 1) of the request of acceleration/deceleration by the driver may be recorded in a matrix while being associated. The information of the degree of the request of acceleration/deceleration by the driver is calculated by, for example, the acceleration/deceleration request detector 80 on the basis of the information of the opening degree of the accelerator and the pressing degree of the brake detected by the position sensor 8 installed in the vehicle. It should be noted that these pieces of data recorded in a matrix as the learning data are data for improving the accuracy of the driving control of the motor 3 at the time of failure. The present invention is not limited to these pieces of data as long as the goal can be realized, and other data and parameters can be used.

Further, the learning data recorded in a matrix may be, for example, a parameter preferentially considered in the control at the time of failure by applying predetermined weighting to information such as the current value (UVW current value) of the motor 3 closely related to the motor angle and the vehicle inclination angle. Further, a numerical formula showing a correspondence relation among these pieces of data or a numerical formula predicting the motor angle from a predetermined parameter is obtained by predetermined conditions or procedures on the basis of the learning data recorded in a matrix, and the content, the coefficients or the like may be recorded.

In addition, in the case where a failure is detected by the failure detector 41 of the motor angle detector 40, the motor control circuit 10 is switched by the selector 12 so that not the control signal from the motor control signal generator 11 but the control signal from the generator 60 of a motor control signal at the time of failure of the learning circuit 70 is input to the PWM generation circuit 13. Accordingly, the motor driving control at the time of failure is performed.

The generator 60 of a motor control signal at the time of failure obtains the predicted value of the motor angle of the motor 3 from, for example, the information of the vehicle speed detected by the vehicle speed detector 50, the information (the UVW current value detected by the current detector 20) of the torque of the motor 3, and the information of the vehicle inclination angle of the vehicle detected by the vehicle inclination angle detector 90 on the basis of the learning data recorded in the storage apparatus 71. In addition, the control signal for the PWM generation circuit 13 is generated and output so that the motor 3 is properly driven on the basis of the predicted motor angle.

Further, the vehicle speed under the control at the time of control and the information of the degree of the request of acceleration/deceleration are fed back to the generator 60 of a motor control signal at the time of failure as the information of the correction instruction by the driver in the travelling environment for the control content. In the generator 60 of a motor control signal at the time of failure, for example, the control value correction circuit 61 can correct the control signal output to the PWM generation circuit 13 on the basis of these pieces of feedback information.

Accordingly, it is possible to properly adapt to, for example, the travelling environments such as a mountain road and a slope in the driving control of the motor 3 at the time of failure. In addition, even in the case where a sufficient torque cannot be obtained (or in the case where an excessive torque is obtained), the driver presses the accelerator (or the brake) to avoid the situation. Thus, it is possible to recognize the degree of the request of acceleration/deceleration to be fed back to the driving control of the motor 3.

<Example of Motor Driving Control>

Figure 2:
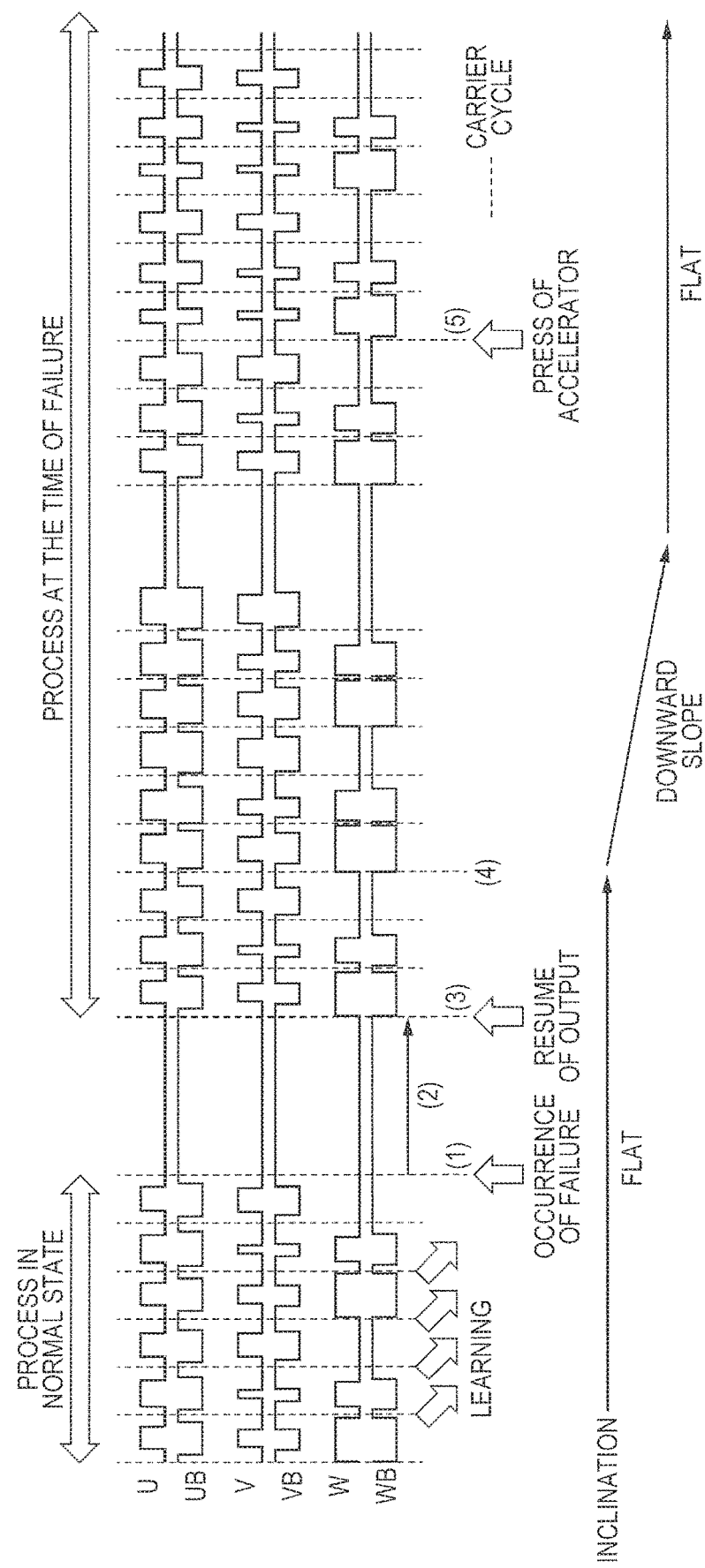
FIG. 2 is a diagram for showing an outline of an example of the pulse waveform of a UVW signal output from an inverter circuit by the driving control of a motor in the first embodiment of the present invention.

FIG. 2 is a diagram for showing an outline of an example of the pulse waveform of the UVW signal output from the inverter circuit 2 by the driving control of the motor 3 in the embodiment. In the control in a normal state, the learning control circuit 72 of the learning circuit 70 records the UVW signal (and the UVW current value) and the information of the PWM signal for generating the same into the storage apparatus 71 as the learning data. Here, (1) when the failure detector 41 detects a failure in which the motor angle detector 40 cannot normally detect the motor angle, (2) the output from the inverter circuit 2 is temporarily stopped until the control at the time of failure by the generator 60 of a motor control signal at the time of failure starts by switching of the selector 12 of the motor control circuit 10.

In addition, when the control at the time of failure, namely, the control on the basis of the motor angle predicted on the basis of the learning data recorded in the storage apparatus 71 starts, (3) the output from the inverter circuit 2 is resumed. Here, (4) in the case where the travelling environment is changed from a flat road to a downward slope, the pulse waveform of the UVW signal is controlled so as to suppress (to decrease the rotation speed) the rotation speed of the wheels in order to keep a constant speed. Namely, the sine wave cycle is prolonged by changing the duty ratio of the UVW signal. Thereafter, (5) in the case where the travelling environment is changed to a flat road again and the drivers presses the accelerator along with the lowering of the vehicle speed, the pulse waveform of the UVW signal is controlled so as to increase (to raise the rotation speed) the rotation speed of the wheels in order to keep a constant speed. Namely, the sine wave cycle is shortened by changing the duty ratio of the UVW signal.

<Processing Content of Motor Driving Control>

Figure 3:
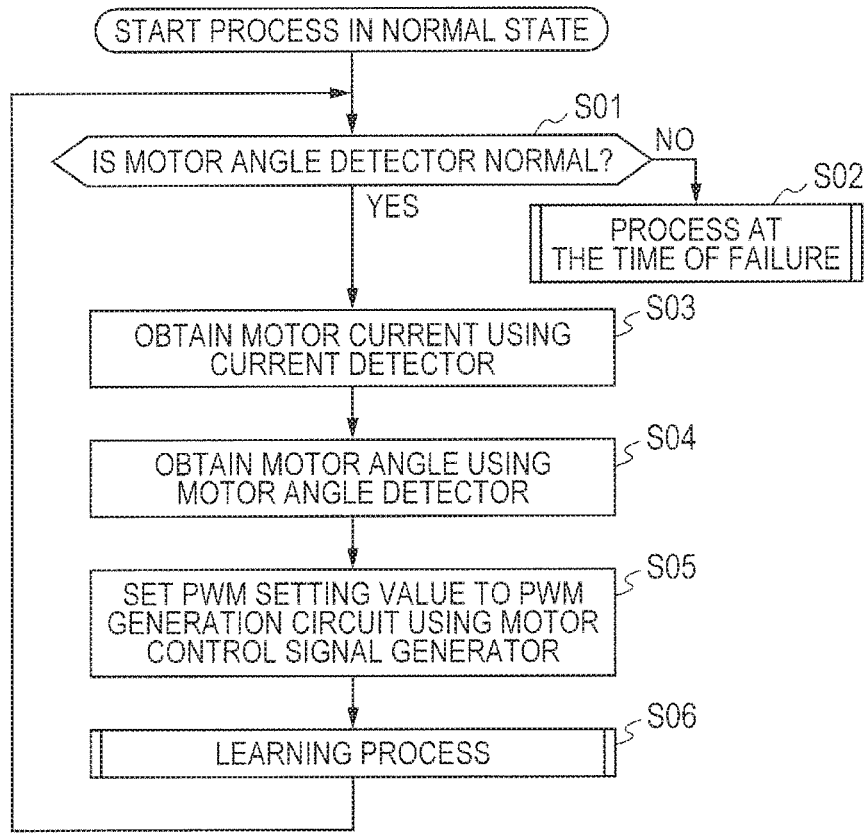
FIG. 3 is a flowchart for showing an outline of an example of a flow of a motor driving control process in a normal state in the first embodiment of the present invention.

FIG. 3 is a flowchart for showing an outline of an example of a flow of a motor driving control process in a normal state in the motor driving system 1 of the embodiment. In a normal state, it is always determined whether or not the motor angle detector 40 is normal (whether the failure detector 41 does not detect a failure) (S01). In the case where the motor angle detector 40 is not normal (in the case where the failure detector 41 detects a failure) (S01: No), the flow moves to a process at the time of failure to be described later (S02).

In the case where the motor angle detector 40 is normal (S01: Yes), the current detector 20 obtains the motor current (UVW current value) (S03), and the motor angle detector 40 obtains the motor angle (S04). It is not necessary to perform these processes in this order. These processes may be performed inversely or in parallel. In addition, on the basis of the information of the obtained motor current and motor angle, the motor control signal generator 11 of the motor control circuit 10 outputs a control signal for setting a register value (hereinafter, referred to as a "PWM setting value" in some cases) so as to output the corresponding PWM signal to the PWM generation circuit 13 (S05). Accordingly, the driving of the motor 3 is controlled through the inverter circuit 2. In addition, after a learning process (S06) to be described later is performed for the conditions of the vehicle and the motor 3 under the control, the flow returns to Step S01 to repeat a series of processes.

Figure 4:
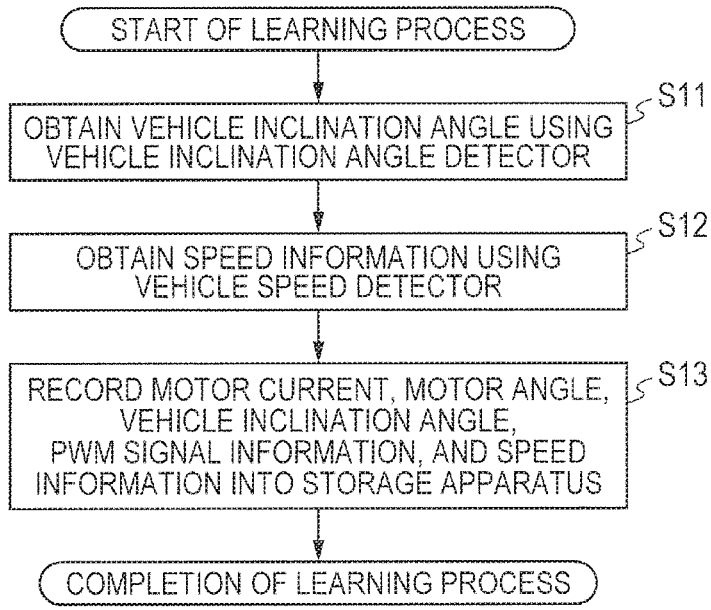
FIG. 4 is a flowchart for showing an outline of an example of a flow of a learning process in the first embodiment of the present invention.

FIG. 4 is a flowchart for showing an outline of an example of a flow of the learning process (Step S06 in FIG. 3) in the embodiment. Further, in the learning process, the vehicle inclination angle detector 90 obtains the information of the vehicle inclination angle (S11), and the vehicle speed detector 50 obtains the information of the speed of the vehicle (S12). It is not necessary to perform these processes in this order. These processes may be performed inversely or in parallel. In addition, the information of the obtained vehicle inclination angle and speed and the information (the PWM signal information may be included) of the motor current obtained in Step S03 of FIG. 3 are associated with the information of the motor angle obtained in Step S04 of FIG. 3 to be recorded in the storage apparatus 71 (S13).

Figure 5:
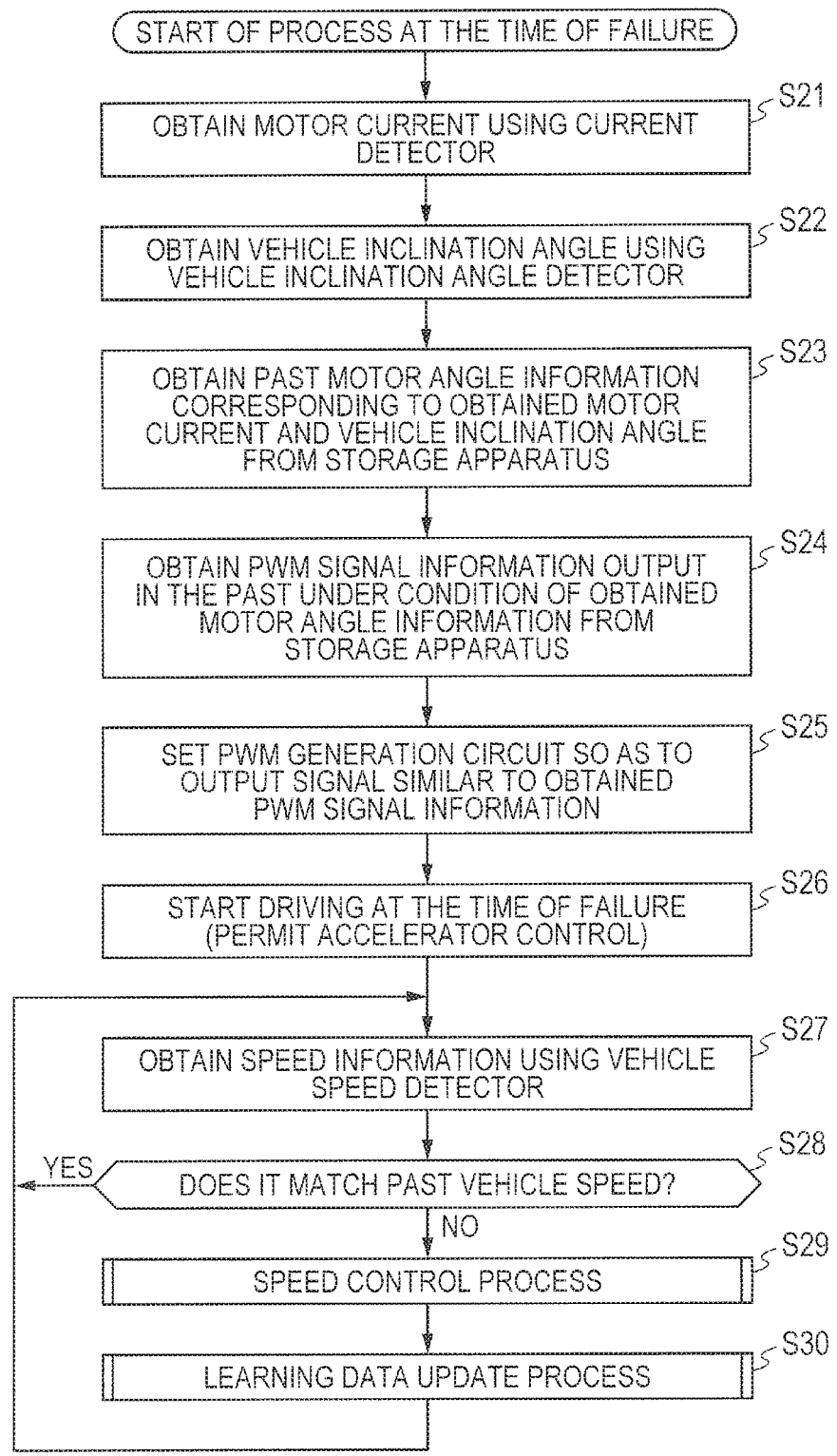
FIG. 5 is a flowchart for showing an outline of an example of a flow of a process at the time of failure in the first embodiment of the present invention.

FIG. 5 is a flowchart for showing an outline of an example of a flow of the process at the time of failure (Step S02 in FIG. 3) in the embodiment. In the process at the time of failure, the current detector 20 obtains the motor current (UVW current value) (S21), and the vehicle inclination angle detector 90 obtains the information of the vehicle inclination angle (S22). It is not necessary to perform these processes in this order. These processes may be performed inversely or in parallel.

In addition, the generator 60 of a motor control signal at the time of failure of the learning circuit 70 obtains information of the past motor angle corresponding to the obtained motor current and vehicle inclination angle from the learning data recorded in the storage apparatus 71 (S23). In addition, the PWM signal information output from the PWM generation circuit 13 in the past under the condition of the obtained motor angle is obtained from the learning data recorded in the storage apparatus 71 (S24). In addition, the PWM setting value is set to the PWM generation circuit 13 so as to output the PWM signal having a waveform similar to that of the obtained PWM signal information (S25). Accordingly, the travelling of the vehicle at the time of failure is started (S26).

It should be noted that the driving control of the motor 3 in Steps S21 to S25 is always performed during the travelling at the time of failure. Further, in the case where the accelerator (or the brake) is operated more than a predetermined amount by the driver during the travelling at the time of failure, an interrupt process of accelerator control for the driving control of the motor 3 to be described later is performed.

The vehicle speed detector 50 always obtains the information of the speed of the vehicle during the travelling at the time of failure (S27). In addition, the information of the past vehicle speed under the condition of the motor angle obtained in Step S24 is obtained from the learning data recorded in the storage apparatus 71, and it is determined whether or not the information of the present vehicle speed obtained in Step S27 matches (including a case in which a difference is equal to or smaller than a predetermined threshold value) the information of the past vehicle speed (S28). In the case where the information of the present vehicle speed matches the information of the past vehicle speed (S28: Yes), the travelling at the time of failure is continued as it is. On the other hand, in the case where the information of the present vehicle speed does not match the information of the past vehicle speed (S28: No), the vehicle speed is corrected and the content is fed back to update the learning data by a speed control process (S29) and a learning data update process (S30) to be described later. Then, the travelling at the time of failure is continued.

Figure 6:
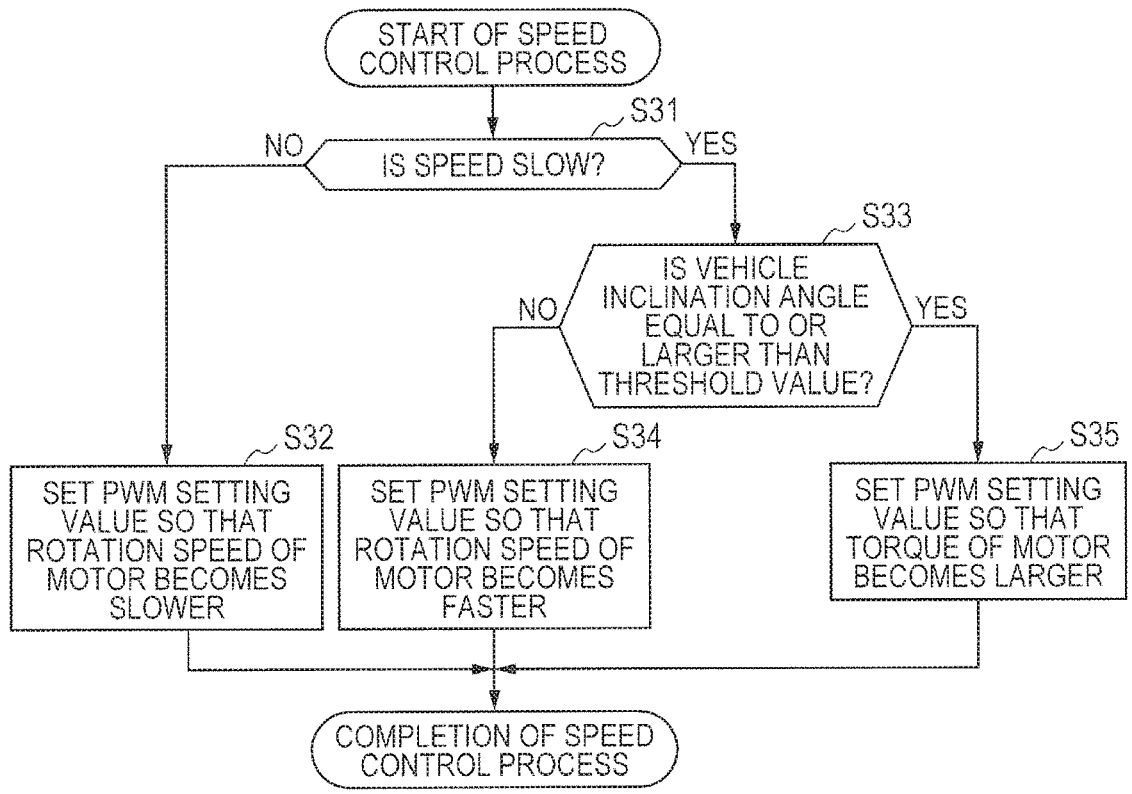
FIG. 6 is a flowchart for showing an outline of an example of a flow of a speed control process in the first embodiment of the present invention.

FIG. 6 is a flowchart for showing an outline of an example of a flow of the speed control process (Step S29 in FIG. 5) in the embodiment. First, it is determined whether or not the present vehicle speed obtained in Step S27 in the process at the time of failure of FIG. 5 is slower than the past vehicle speed compared in Step S28 (S31). In the case where the present vehicle speed is faster (S31: No), the control value correction circuit 61 of the generator 60 of a motor control signal at the time of failure sets the PWM setting value to the PWM generation circuit 13 to output the PWM signal so that the rotation speed of the motor 3 becomes slower (S32).

On the other hand, in the case where the present vehicle speed is slower (S31: Yes), it is determined whether or not the value (that can be basically regarded to be the same as the inclination angle of the road surface) of the vehicle inclination angle of the vehicle obtained in Step S22 in the process at the time of failure of FIG. 5 (S33). In the case where the vehicle inclination angle is smaller than the threshold value (in the case of a gentle upward slope) (S33: No), the control value correction circuit 61 of the generator 60 of a motor control signal at the time of failure sets the PWM setting value to the PWM generation circuit 13 to output the PWM signal so that the rotation speed of the motor 3 becomes faster (S34). In addition, in the case where the vehicle inclination angle is equal to or larger than the threshold value (in the case of a steep upward slope) (S33: Yes), the PWM setting value is to the PWM generation circuit 13 to output the PWM signal so that the torque of the motor 3 becomes larger (S35).

Figure 7:
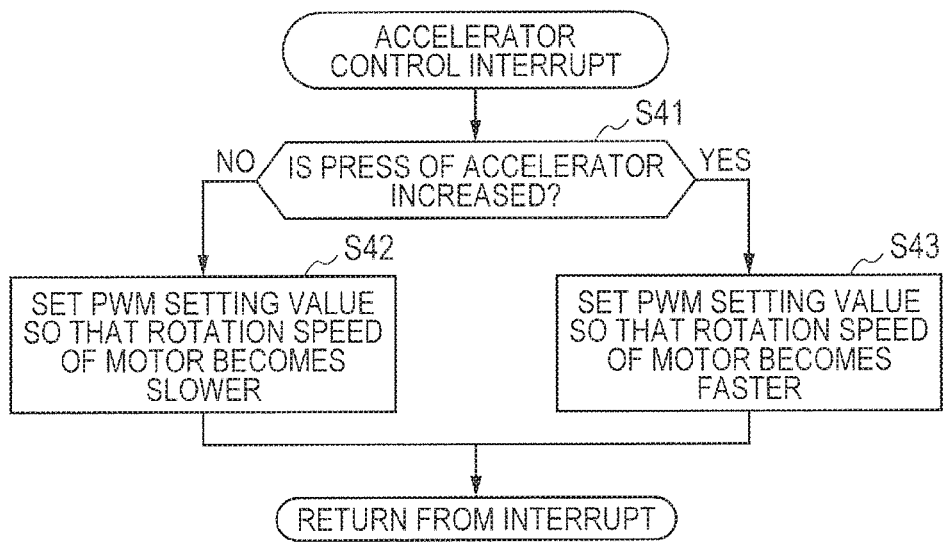
FIG. 7 is a flowchart for showing an outline of an example of an interrupt process of accelerator control in the first embodiment of the present invention.

FIG. 7 is a flowchart for showing an outline of an example of the interrupt process of the accelerator control in the embodiment. As described above, this process is performed as the interrupt process in the case where the accelerator (or the brake) is operated by the driver during the travelling at the time of failure in the process at the time of failure of FIG. 5. First, it is determined whether or not the pressing degree of the accelerator is increased (the opening of the throttle valve is increased) (or whether or not the pressing degree of the brake is decreased) (S41).

In the case where the pressing degree of the accelerator is decreased (or in the case where the pressing degree of the brake is increased) (S41: No), the control value correction circuit 61 of the generator 60 of a motor control signal at the time of failure sets the PWM setting value to the PWM generation circuit 13 to output the PWM signal so that the rotation speed of the motor 3 becomes slower by assuming that the driver attempts to decrease the speed more (S42), and then the process returns from the interrupt. On the other hand, in the case where the pressing degree of the accelerator is increased (or in the case where the pressing degree of the brake is decreased (S41: Yes), the PWM setting value is set to the PWM generation circuit 13 to output the PWM signal so that the rotation speed of the motor 3 becomes faster by assuming that the driver attempts to increase the speed more (S43), and then the process returns from the interrupt.

It should be noted that a condition in which the pressing degree of the accelerator (or the brake) or the increase/decrease rate of the pressing degree is equal to or larger than a predetermined threshold value (namely, the pressing degree is different from the operation mount of the accelerator during the travelling in a stable state) may be further added in the determination of the operation content of the accelerator (or the brake) in Step S41.

Figures 8, 9:
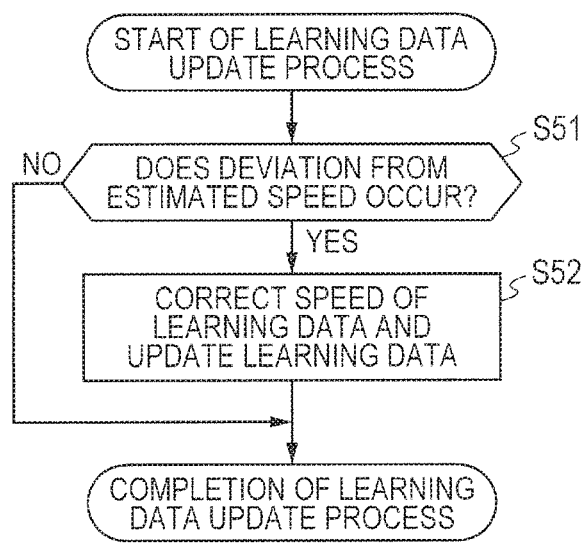
FIG. 8 is a flowchart for showing an outline of an example of a flow of a learning data update process in the first embodiment of the present invention.
FIG. 9 is a diagram for showing an outline of an example of table data in the first embodiment of the present invention.

FIG. 8 is a flowchart for showing an outline of an example of a flow of the learning data update process (Step S30 in FIG. 5) in the embodiment. Here, it is determined whether or not the present vehicle speed during the travelling at the time of failure obtained in Step S27 of FIG. 5 is deviated, by a certain value or larger, from information (namely, an estimated speed in the learning data recorded in the storage apparatus 71) of the past vehicle speed under the condition of the motor angle obtained in Step S24 of FIG. 5 (S51).

In the case where there is no deviation by a certain value or larger (S51: No), the learning data is not updated. On the other hand, in the case where the deviation by a certain value or larger occurs (S51: Yes), the information (information of the estimated speed) of the corresponding past vehicle speed in the learning data recorded in the storage apparatus 71 is updated with the information of the present vehicle speed (S52).

<Content of Learning Process>

An example of the content of the learning process shown in FIG. 4 or FIG. 8 will be described below while being compared with the related art.

As described above, in the related art, the relation between the information of the motor angle detected by the motor angle detector 40 and the information of the vehicle speed detected by the vehicle speed detector 50 is recorded in the storage apparatus 71. In addition, for example, when the generator 60 of a motor control signal at the time of failure calculates the PWM setting value for the PWM generation circuit 13 at the time of failure of the motor angle detector 40, the information of the motor angle corresponding to the vehicle speed is extracted from the storage apparatus 71, and the PWM setting value is generated on the basis of the information to be output to the PWM generation circuit 13.

On the contrary, in the embodiment shown in the example of FIG. 1, when calculating the PWM setting value for the PWM generation circuit 13 at the time of failure, the information of the vehicle inclination angle detected by the vehicle inclination angle detector 90 and the control content of the accelerator and brake detected by the acceleration/deceleration request detector 80 are added as correction parameters, and the motor driving control in accordance with the travelling environment of the vehicle is realized.

As methods of the correction, for example, a method in which correction data is used as a function to determine the PWM setting value to be output by setting an input value to the function and a method in which the information of the PWM setting values related to the past vehicle conditions is recorded as table data and the PWM setting value obtained from the table is switched in accordance with the value of the correction parameter can be employed.

As the method of using the correction data as a function, for example, the following method can be employed.

When the setting information related to the PWM setting value to be set to the PWM generation circuit 13 to output the PWM signal for proper motor driving control in the present travelling environment is represented by y, the setting information obtained from the learning data on the basis of the actual vehicle speed detected by the vehicle speed detector 50 is represented by x, and a correction coefficient is represented by α, y can be represented by an equation of y=αx.

Here, the correction coefficient α is determined on the basis of, for example, the degree of the acceleration/deceleration request detected by the acceleration/deceleration request detector 80, and the information of the vehicle inclination angle detected by the vehicle inclination angle detector 90. In the case where acceleration is requested by an accelerator operation by the driver, or in the case where the vehicle inclination angle is on the positive side, a value on the positive side is set as the correction coefficient α, and the PWM setting value is set so that the rotation speed of the motor 3 becomes faster. On the contrary, in the case where deceleration is requested by a brake operation, or in the case where the vehicle inclination angle is on the negative side, a value on the negative side is set as the correction coefficient α, and the PWM setting value is set so that the rotation speed of the motor 3 becomes slower. The value of the correction coefficient α is set by, for example, obtaining from a table in which a value corresponding to each condition is preliminarily set. In the case where the speed estimated by the driver cannot be obtained as a result of the motor driving control using the set correction coefficient α, the value of the correction coefficient α is updated.

As described above, the motor driving control is performed so as to be closer to the travelling environment intended by the driver by correcting the PWM setting value set on the basis of the actual speed of the vehicle in accordance with the actual travelling environment of the vehicle.

Further, as the method of using the information (learning data) of the PWM setting values related to the past vehicle conditions as the table data, for example, the following method can be employed.

FIG. 9 is a diagram for showing an outline of an example of the table data in the embodiment. In a process in a normal state, the information of the motor angle detected at each time by the motor angle detector 40, the vehicle speed detected by the vehicle speed detector 50, the vehicle inclination angle detected by the vehicle inclination angle detector 90, the motor current value detected by the current detector 20, and the PWM setting value is recorded as table data. In the case where past table data needs to be updated in accordance with the conditions of the vehicle, the data is updated every time. It should be noted that the present invention is not limited to a case in which data obtained by actually travelling by the driver is recorded, but the table data may be set in advance by, for example, a vehicle manufacturer or a vehicle dealer.

In the case where a failure occurs in the motor angle detector 40, a comparison of the information except for the motor angle, namely, the information of the vehicle speed, the vehicle inclination angle, the motor current value, and the PWM setting value with the value at each time in the table data is started as the process at the time of failure. In addition, the driving control of the motor 3 is performed in such a manner that the table data matching the information except for the motor angle is searched for, and the control signal is output so that the PWM setting value obtained on the basis of the content of the extracted table data is set to the PWM generation circuit 13.

In the case where the accelerator (or the brake) is operated by the driver during the traveling at the time of failure, a feedback process (learning data update process) for the table data is performed. Namely, in the case where the accelerator (or the brake) is operated by the driver in the driving control of the motor 3 set on the basis of the past data extracted from the table data, it is determined that a request for correcting the content of the table data occurs, and the target table data is switched (or corrected) to the table data matching the acceleration/deceleration request of the driver.

For example, in the case where the accelerator is pressed, the PWM signal output on the basis of the present PWM setting value means that the vehicle speed (or the torque) is deficient. Therefore, it is necessary to switch the table data so as to increase the vehicle speed. At this time, data containing information closest to the present vehicle speed, the vehicle inclination angle, and the motor current value and information of a vehicle speed faster than the present vehicle speed is searched for in the table data, and the table data is switched so as to use the PWM setting value in the extracted data.

In the case where the accelerator (or the brake) is not operated by the driver in a predetermined period of time after switching the table data, it is determined that the speed reaches the vehicle speed requested by the driver. In addition, the information of the motor current value and the PWM setting value associated with the information of the initial vehicle inclination angle and vehicle speed in the table data is rewritten by values changed as a result of the acceleration/deceleration request of the driver. Accordingly, the learning data can be corrected in accordance with the travelling environment of the vehicle even at the time of failure, and thus the driving control of the motor 3 can be performed so as to realize safer travelling of the vehicle.

As described above, according to the motor driving system 1 that is the first embodiment of the present invention, the driving control of the motor 3 can be properly performed even in the travelling environment such as a mountain road or a slope where the wheels may idle. Further, even in the case where the vehicle speed and the torque cannot be sufficiently obtained in the motor 3, or the vehicle speed and the torque are excessive, the driving control of the motor 3 can be properly performed on the basis of the degree of the acceleration/deceleration request of the driver.

Second Embodiment

A motor driving system that is a second embodiment of the present invention is configured in such a manner that a motor driving microcomputer (hereinafter, referred to as "MGMCU" in some cases) is used in the configuration shown in FIG. 1 of the above-described first embodiment.

Figure 10:
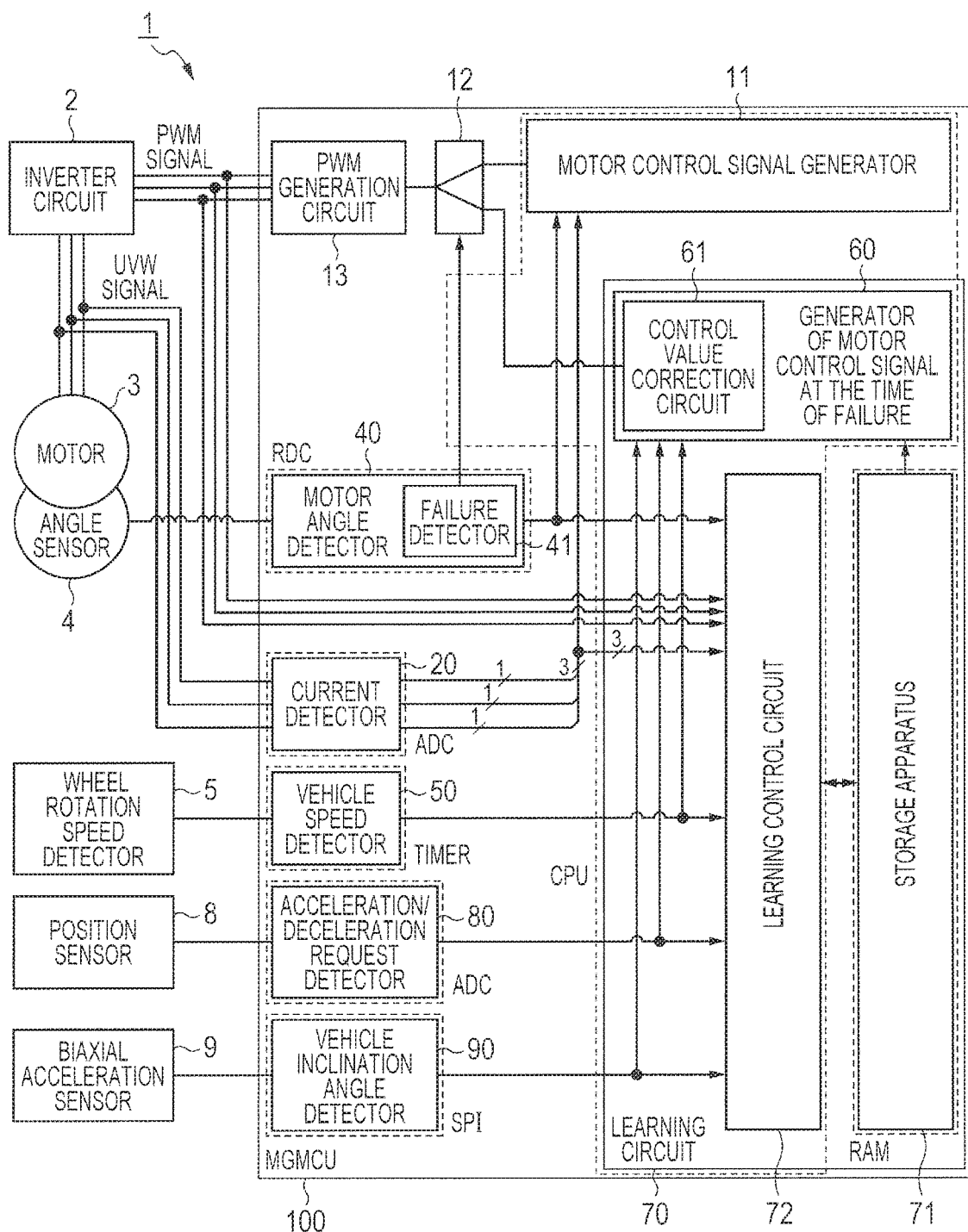
FIG. 10 is a diagram for showing an outline of a configuration example of a motor driving system that is a second embodiment of the present invention.

FIG. 10 is a diagram for showing an outline of a configuration example of the motor driving system that is the second embodiment of the present invention. Here, as similar to the configuration example of FIG. 1, the motor driving system is configured using a microcomputer (MGMCU) 100 that is generally used. In addition, the learning function in the learning circuit 70 shown in the above-described first embodiment and the process related to the driving control of the motor 3 by the learning circuit 70 and the motor control signal generator 11 are realized by executing a software program using a CPU (Central Processing Unit) and a RAM included in the MGMCU 100. It should be noted that the configuration shown in FIG. 10 is an example, and another configuration may be employed depending on functions of various sensors of the outside.

As shown in the drawing, the MGMCU 100 has, for example, an RDC (Resolver to Digital Converter), an ADC (Analog to Digital Converter), a TIMER, an SPI (Serial Peripheral Interface), a CPU, a RAM, a PWM generation circuit 13, and a selector 12.

The RDC has a function of converting data of an input rotation angle into digital data. Namely, the RDC can realize the function same as the motor angle detector 40 in the configuration example of FIG. 1 in the first embodiment. Angle data from an angle sensor 4 is input to the RDC to calculate digital data of the angle (motor angle) of a rotor of a motor 3, and the digital data is transferred to the CPU side. It should be noted that the RDC is not limited to one that is configured using hardware to obtain an angle, but may calculate an angle using software.

The ADC has a function of converting input analog data into digital data. Namely, the ADC can realize the function same as the current detector 20 in the configuration example of FIG. 1 in the first embodiment. The current value of the UVW signal is input to the ADC to convert into digital data, and the digital data is transferred to the CPU side. Further, the ADC can realize the function same as the acceleration/deceleration request detector 80. The voltage of a measurement result output from a position sensor 8 is input to the ADC to convert into digital data, and the digital data is transferred to the CPU side.

The TIMER has a function of measuring the signal width or rising/falling of a signal input from the outside. Namely, the TIMER can realize the function same as the vehicle speed detector 50 in the configuration example of FIG. 1 in the first embodiment. The TIMER calculates vehicle speed data from a signal indicating the rotation speed of the wheels input from a wheel rotation speed detector 5, and transfers the same to the CPU side.

The SPI has a function of delivering communication data input from the outside. Namely, the SPI can realize the function same as the vehicle inclination angle detector 90 in the configuration example of FIG. 1 in the first embodiment. The SPI receives data of an inclination output from a biaxial acceleration sensor 9 (or a gyro sensor), and transfers the same to the CPU side.

The RAM can realize the function same as the storage apparatus 71 in the configuration example of FIG. 1 in the first embodiment. The RAM records learning data output from the CPU to be described later, and can retrieve and output the target learning data in accordance with a request from the CPU at the time of failure.

The CPU can realize the functions same as the learning control circuit 72 of the learning circuit 70, the generator 60 of a motor control signal at the time of failure, and the motor control signal generator 11 in the configuration example of FIG. 1 in the first embodiment. Namely, in a normal state, the CPU obtains a PWM setting value on the basis of information of the motor angle from the RDC and information of the motor current from the ADC, and outputs the same to a PWM generation circuit 13. Further, at this time, each data related to the vehicle state received from the RDC, the ADC, the TIMER, and the SPI is output to the RAM to be accumulated as the learning data.

Further, in an abnormal state, by transiting to the motor driving control at the time of failure using the failure detection signal from the RDC as a trigger, the information of the PWM setting value in a similar vehicle condition is obtained from the past information (learning data) accumulated in the RAM on the basis of the information of the motor current from the ADC and the information of the vehicle inclination angle from the SPI. In addition, the PWM setting value is corrected on the basis of the vehicle speed information from the TIMER and the information of the acceleration/deceleration request from the ADC to be output to the PWM generation circuit 13. Accordingly, the motor driving control can be seamlessly continued.

Further, in the case where the speed is corrected by the acceleration/deceleration request of the driver in the motor driving control on the basis of such learning data, the content of the learning data recorded in the RAM is corrected and updated for feedback on the basis of the vehicle speed information from the TIMER and the information of the acceleration/deceleration request from the ADC. Accordingly, the motor driving control can be realized in accordance with the intention of the driver.

As described above, according to the motor driving that is the second embodiment of the present invention, the configuration of the embodiment exemplified in FIG. 10 can be easily realized only by coupling the wheel rotation speed detector 5 and the biaxial acceleration sensor 9 already mounted in the vehicle to the MGMCU used from the past.

Further, outputting the PWM setting value and obtaining and learning the information related to the vehicle condition detected by each sensor are performed in one MGMCU, and thus a route through which the MGMCU receives the PWM setting value from the outside is not necessary. As described above, the implementation can be realized by one MGMCU, and thus the number of parts and the system area can be reduced. Further, the connection between the functions is closed in the MGMCU, and thus it is possible to respond to a faster operation as compared to a case in which the functions are configured using different parts.

The invention achieved by the inventors has been concretely described above on the basis of the embodiments. However, it is obvious that the present invention is not limited to the above-described embodiments, and can be variously changed without departing from the gist thereof. For example, the embodiments have been described in detail in order to easily understand the present invention, and are not necessarily limited to those having all the configurations described above. Further, apart of a configuration of an embodiment can be replaced by a configuration of another embodiment, and a part of a configuration of an embodiment can be added to a configuration of another embodiment. Further, for apart of a configuration of each embodiment, addition, deletion, and replacement of another configuration are possible.

Further, each of the above-described configurations, functions, processing units, processing means, and the like may be realized by hardware by designing a part or all thereof using, for example, an integrated circuit. Further, each of the above-described configurations, functions, and the like may be realized by software so that a processor interprets and executes a program realizing each function. Information such as a program, a table, a file, or the like that realizes each function can be stored in a recording device such as a memory, a hard disk, or an SSD (Solid State Drive), or a recording medium such as an IC card, an SD card, or a DVD. Further, a process may be requested to a central server system, if possible, by coupling each of the above-described functions to an external network through a wireless communication function to obtain a processing result.

Further, the control lines and the information lines that are considered to be necessary for explanation are illustrated in each of the drawings, and all the control lines and the information lines to be mounted are not necessarily illustrated. In fact, almost all the configurations may be considered to be mutually coupled.

What is claimed is:

1. A motor driving system comprising:
   a motor angle detection circuit that receives a motor angle signal to detect a motor angle that is the angle of a rotor of a motor;
   a current detection circuit that receives a motor current signal to detect a motor current value that is the value of a current for driving the motor;
   a mobile object inclination angle detection circuit that receives an inclination angle signal to detect a mobile object inclination angle that is the inclination angle of a mobile object that moves by driving the motor;
   a motor control circuit that outputs a control signal for controlling the driving of the motor;
   a storage apparatus; and
   a mobile object speed detection circuit that detects a mobile object speed that is the speed of the mobile object,
   wherein the storage apparatus stores data obtained by associating the motor current value, a setting value in the motor control circuit for outputting the control signal, the mobile object inclination angle, and the motor angle at a first time with each other, and
   wherein the motor control circuit controls the driving of the motor based on information of the motor current value and the mobile object inclination angle at a second time and the data at the first time,
   wherein the storage apparatus stores data obtained by associating the motor current value, the setting value, the mobile object inclination angle, the mobile object speed, and the motor angle at the first time with each other,
   wherein the motor control circuit controls the driving of the motor based on information of the motor current value, the mobile object inclination angle, and the mobile object speed at the second time and the data at the first time, and
   wherein in a case where a difference between the mobile object speed as a result of the control of the motor driving at the second time and the mobile object speed at the second time is equal to or larger than a predetermined value, the motor control circuit updates the data stored in the storage apparatus based on information of the result of the control of the motor driving at the second time.

2. The motor driving system according to claim 1, further comprising a failure detection circuit that detects a failure of the motor angle detection circuit to output a failure detection signal,
   wherein the first time is a time before outputting the failure detection signal, and
   wherein the second time is a time after outputting the failure detection signal.

3. The motor driving system according to claim 1, further comprising an acceleration/deceleration request detection circuit that detects acceleration/deceleration request information that is information related to a degree of a request of acceleration/deceleration by a user for the mobile object,
   wherein the storage apparatus stores data obtained by associating the motor current value, the setting value, the mobile object inclination angle, the acceleration/deceleration request information, and the motor angle at the first time with each other, and
   wherein the motor control circuit controls the driving of the motor based on the motor current value, the mobile object inclination angle, and the acceleration/deceleration request information at the second time and the data at the first time.

4. The motor driving system according to claim 3, wherein the acceleration/deceleration request information is generated based on an input of an accelerator or a brake provided in the mobile object.

5. A motor driving method comprising the steps of:
   obtaining a motor angle that is the angle of a rotor of a motor mounted in a mobile object;
   obtaining a motor current value that is the value of a current for driving the motor;
   obtaining information of a mobile object inclination angle that is the inclination angle of the mobile object;
   generating data obtained by associating the motor current value, a signal value for controlling the driving of the motor, the mobile object inclination angle, and the motor angle at a first time with each other;
   storing the associated data in a storage apparatus;
   controlling the driving of the motor based on information of the motor current value and the mobile object inclination angle at a second time and the data at the first time;
   detecting a mobile object speed that is the speed of the mobile object;
   generating data obtained by associating the motor current value, a setting value for controlling the driving of the motor, the mobile object inclination angle, the mobile object speed, and the motor angle at the first time with each other to be stored in the storage apparatus; and
   controlling the driving of the motor based on information of the motor current value, the mobile object inclination angle, and the mobile object speed at the second time and the data at the first time,
   wherein in a case where a difference between the mobile object speed as a result of the control of the motor driving at the second time and the mobile object speed at the second time is equal to or larger than a predetermined value, the data stored in the storage apparatus is updated based on information of the result of the control of the motor driving at the second time.

6. The motor driving method according to claim 5, further comprising the step of detecting a failure in which the motor angle cannot be obtained,
   wherein the first time is a time before detecting the failure, and
   wherein the second time is a time after detecting the failure.

7. The motor driving method according to claim 5, further comprising the steps of:
   detecting acceleration/deceleration request information that is information related to a degree of a request of acceleration/deceleration by a user for the mobile object;
   generating data obtained by associating the motor current value, a setting value for controlling the driving the motor, the mobile object inclination angle, the acceleration/deceleration request information, and the motor angle at the first time with each other to be stored in the storage apparatus; and
   controlling the driving of the motor based on the motor current value, the mobile object inclination angle, and the acceleration/deceleration request information at the second time and the data at the first time.

8. The motor driving method according to claim 7, wherein the acceleration/deceleration request information is generated based on an input of an accelerator or a brake provided in the mobile object.

* * * * *